United States Patent
Krüger et al.

(10) Patent No.: US 11,565,926 B2
(45) Date of Patent: *Jan. 31, 2023

(54) CARTRIDGE RECEIVER, CARTRIDGE SYSTEM, DRINK PREPARATION MACHINE AND METHOD FOR PRODUCING A DRINK

(71) Applicant: Freezio AG, Amriswil (CH)

(72) Inventors: Marc Krüger, Bergisch Gladbach (DE); Günter Empi, Bergisch Gladbach (DE); Daniel Fischer, Romanshorn (CH)

(73) Assignee: Freezio AG, Amriswil (CH)

( * ) Notice: Subject to any disclaimer, the term of this patent is extended or adjusted under 35 U.S.C. 154(b) by 31 days.

This patent is subject to a terminal disclaimer.

(21) Appl. No.: 16/390,471

(22) Filed: Apr. 22, 2019

(65) Prior Publication Data

US 2019/0241421 A1 Aug. 8, 2019

Related U.S. Application Data

(63) Continuation of application No. 16/069,627, filed as application No. PCT/EP2017/050567 on Jan. 12, 2017.

(30) Foreign Application Priority Data

Jan. 12, 2016 (DE) .......................... 102016200254.6
Jul. 1, 2016 (DE) .......................... 102016212012.3
(Continued)

(51) Int. Cl.
*A23L 2/00* (2006.01)
*A47J 31/40* (2006.01)
(Continued)

(52) U.S. Cl.
CPC .............. *B67D 1/0079* (2013.01); *A23L 2/54* (2013.01); *A47J 31/0673* (2013.01);
(Continued)

(58) Field of Classification Search
CPC .............. B65D 85/8043; B65D 85/804; B65D 85/8046; B67D 1/04; B67D 1/0046;
(Continued)

(56) References Cited

U.S. PATENT DOCUMENTS 3,904,083 A 9/1975 Little
4,314,768 A 2/1982 Goglio et al.
(Continued)

FOREIGN PATENT DOCUMENTS

CA 2556421 C 9/2005
CN 1499948 A 5/2004
(Continued)

OTHER PUBLICATIONS

European Search Report for European Application No. 19157795, dated Jun. 13, 2019.
(Continued)

*Primary Examiner* — Ericson M Lachica
(74) *Attorney, Agent, or Firm* — The Dobrusin Law Firm, P.C.

(57) ABSTRACT

The invention relates to a cartridge system (1) for producing a drink in a drink preparation machine, comprising a cartridge (2) that has a reservoir (6) filed with a drink substance (7), and a cartridge receiver (10) that can be reversibly connected to the cartridge, said cartridge receiver (10) comprising a mixing chamber (8) and a cartridge discharge device (34) which causes at least partial transfer of the drink substance (7) from the reservoir (6) into the mixing chamber (8), and said cartridge receiver (10) comprising a fluid supply (12) which opens into the mixing chamber (8). The
(Continued)

invention also relates to the cartridge receiver (10) of the cartridge system (1), the drink preparation machine, and the corresponding method for producing a drink (70).

20 Claims, 4 Drawing Sheets

(30) Foreign Application Priority Data

| Jul. 1, 2016 | (DE) | .................. | 102016212013.1 |
|---|---|---|---|
| Sep. 27, 2016 | (DE) | .................. | 102016218507.1 |
| Sep. 27, 2016 | (DE) | .................. | 102016218509.8 |
| Sep. 29, 2016 | (DE) | .................. | 102016218884.4 |

(51) Int. Cl.

| B67D 1/00 | (2006.01) |
|---|---|
| B67D 7/02 | (2010.01) |
| B67D 1/04 | (2006.01) |
| A47J 31/06 | (2006.01) |
| A47J 31/36 | (2006.01) |
| B65D 51/22 | (2006.01) |
| B65D 85/804 | (2006.01) |
| A23L 2/54 | (2006.01) |
| A47J 31/44 | (2006.01) |
| B67D 1/08 | (2006.01) |
| B65D 51/28 | (2006.01) |

(52) U.S. Cl.
CPC ......... *A47J 31/3628* (2013.01); *A47J 31/407* (2013.01); *A47J 31/4425* (2013.01); *A47J 31/4492* (2013.01); *B65D 51/223* (2013.01); *B65D 51/226* (2013.01); *B65D 85/8043* (2013.01); *B65D 85/8055* (2020.05); *B67D 1/0022* (2013.01); *B67D 1/0046* (2013.01); *B67D 1/0078* (2013.01); *B67D 1/04* (2013.01); *B67D 1/045* (2013.01); *B67D 7/0227* (2013.01); *B67D 7/0233* (2013.01); *A23V 2002/00* (2013.01); *A47J 31/3695* (2013.01); *B65D 51/2835* (2013.01); *B67D 2001/0811* (2013.01); *B67D 2001/0812* (2013.01)

(58) Field of Classification Search
CPC ............... B67D 1/0079; B67D 1/0078; B67D 2001/0812; B67D 7/0233; A47J 31/407; A47J 31/4425; A23L 2/54
See application file for complete search history.

(56) References Cited

U.S. PATENT DOCUMENTS

| 4,323,171 | A | 4/1982 | Whorton, III et al. |
|---|---|---|---|
| 4,376,496 | A | 3/1983 | Sedam et al. |
| 4,581,239 | A | 4/1986 | Woolman et al. |
| 4,708,266 | A | 11/1987 | Rudick |
| 4,829,889 | A | 5/1989 | Takeuchi et al. |
| 4,938,387 | A | 7/1990 | Kervefors et al. |
| 5,097,989 | A | 3/1992 | Nakayama et al. |
| 5,301,838 | A | 4/1994 | Schmidt et al. |
| 5,435,462 | A | 7/1995 | Fujii |
| 5,494,194 | A | 2/1996 | Topper et al. |
| 5,836,482 | A | 11/1998 | Ophardt |
| 5,876,995 | A | 3/1999 | Bryan |
| 5,897,899 | A | 4/1999 | Fond |
| 6,789,707 | B2 | 9/2004 | Wright |
| 6,971,549 | B2 | 12/2005 | Leifheit et al. |
| 6,971,589 | B2 | 12/2005 | Incardona et al. |
| 7,597,922 | B2 | 10/2009 | Cheng et al. |
| 8,544,692 | B2 | 10/2013 | Rusch et al. |
| 8,596,498 | B2 | 12/2013 | Werner et al. |
| 2002/0007671 | A1 | 1/2002 | Lavi et al. |
| 2002/0078831 | A1 | 6/2002 | Cai |
| 2002/0130140 | A1 | 9/2002 | Cote |
| 2002/0144603 | A1 | 10/2002 | Taylor |
| 2002/0193777 | A1 | 12/2002 | Aneas |
| 2003/0000964 | A1 | 1/2003 | Schroeder et al. |
| 2003/0036725 | A1 | 2/2003 | Lavi et al. |
| 2003/0070554 | A1 | 4/2003 | Cortese |
| 2003/0071058 | A1 | 4/2003 | Studer et al. |
| 2003/0097314 | A1 | 5/2003 | Crisp, III et al. |
| 2003/0222089 | A1 | 12/2003 | Hale |
| 2004/0055472 | A1 | 3/2004 | Stoner |
| 2004/0129145 | A1 | 7/2004 | Denisart et al. |
| 2004/0188459 | A1 | 9/2004 | Halliday et al. |
| 2004/0250686 | A1 | 12/2004 | Hale |
| 2005/0077318 | A1 | 4/2005 | Macler et al. |
| 2005/0151764 | A1 | 7/2005 | Grady et al. |
| 2005/0160919 | A1 | 7/2005 | Balkau |
| 2005/0269362 | A1 | 12/2005 | Guerrero et al. |
| 2006/0000851 | A1 | 1/2006 | Girard et al. |
| 2006/0047250 | A1 | 3/2006 | Hickingbotham et al. |
| 2006/0102012 | A1 | 5/2006 | Pope et al. |
| 2006/0138177 | A1 | 6/2006 | Wauters et al. |
| 2006/0174769 | A1 | 8/2006 | Fave et al. |
| 2006/0249536 | A1 | 11/2006 | Hartman et al. |
| 2006/0255066 | A1 | 11/2006 | Kannar et al. |
| 2007/0175334 | A1 | 8/2007 | Halliday et al. |
| 2007/0199453 | A1 | 8/2007 | Rasmussen et al. |
| 2008/0029541 | A1 | 2/2008 | Wallace et al. |
| 2008/0302252 | A1 | 12/2008 | O'Bien et al. |
| 2009/0145926 | A1* | 6/2009 | Klopfenstein ....... B67D 1/0044 222/129.4 |
| 2009/0183640 | A1 | 7/2009 | Ozanne |
| 2009/0199518 | A1 | 8/2009 | Deuber et al. |
| 2009/0272274 | A1 | 11/2009 | De Graaff et al. |
| 2009/0308488 | A1 | 12/2009 | Bennett |
| 2010/0049362 | A1 | 2/2010 | Hatuka |
| 2010/0064899 | A1 | 3/2010 | Aardenburg |
| 2010/0107889 | A1 | 5/2010 | Denisart et al. |
| 2010/0147154 | A1 | 6/2010 | De Graaff et al. |
| 2010/0180774 | A1 | 7/2010 | Kollep et al. |
| 2010/0186851 | A1 | 7/2010 | Rusch et al. |
| 2010/0193544 | A1 | 8/2010 | Rusch et al. |
| 2010/0206177 | A1 | 8/2010 | Ricotti |
| 2011/0000377 | A1 | 1/2011 | Favre |
| 2011/0110180 | A1 | 5/2011 | Snider et al. |
| 2011/0226343 | A1 | 9/2011 | Novak et al. |
| 2012/0037662 | A1 | 2/2012 | Romanyszyn et al. |
| 2012/0052159 | A1 | 3/2012 | Doleac et al. |
| 2012/0090473 | A1 | 4/2012 | Deuber |
| 2012/0121780 | A1 | 5/2012 | Lai et al. |
| 2012/0156337 | A1* | 6/2012 | Studor ............... A23F 5/26 426/231 |
| 2012/0180671 | A1 | 7/2012 | Baudet et al. |
| 2012/0199011 | A1 | 8/2012 | Cheng |
| 2012/0199227 | A1 | 8/2012 | Manser et al. |
| 2012/0207893 | A1 | 8/2012 | Krüger |
| 2012/0231124 | A1 | 9/2012 | Kamerbeek et al. |
| 2013/0055903 | A1 | 3/2013 | Deuber |
| 2013/0061762 | A1 | 3/2013 | Carr et al. |
| 2013/0062366 | A1 | 3/2013 | Tansey |
| 2013/0084376 | A1 | 4/2013 | Fischer |
| 2013/0129870 | A1 | 5/2013 | Novak et al. |
| 2013/0224340 | A1 | 8/2013 | BenDavid |
| 2013/0239820 | A1 | 9/2013 | Baldo |
| 2013/0340626 | A1 | 12/2013 | Oh |
| 2014/0033934 | A1 | 2/2014 | Chou |
| 2014/0109772 | A1 | 4/2014 | Denisart et al. |
| 2014/0130678 | A1 | 5/2014 | Frydman |
| 2014/0227403 | A1 | 8/2014 | Fischer |
| 2014/0245893 | A1 | 9/2014 | Vu |
| 2014/0338542 | A1 | 11/2014 | Smith et al. |
| 2014/0345472 | A1 | 11/2014 | Fitz et al. |
| 2015/0050392 | A1 | 2/2015 | Stonehouse et al. |
| 2015/0056330 | A1 | 2/2015 | Dogan et al. |
| 2015/0201790 | A1* | 7/2015 | Smith ............... A47J 31/525 426/431 |
| 2015/0216353 | A1 | 8/2015 | Polti |

(56) References Cited

U.S. PATENT DOCUMENTS

| | | |
|---|---|---|
| 2015/0238039 A1 | 8/2015 | Fischer et al. |
| 2015/0344285 A1 | 12/2015 | Joseph |
| 2015/0374025 A1 | 12/2015 | Evans et al. |
| 2016/0109175 A1* | 4/2016 | Mackey .................. A47J 31/54 62/3.64 |
| 2016/0297664 A1 | 10/2016 | Broodryk |
| 2016/0309948 A1 | 10/2016 | Dees et al. |
| 2016/0338527 A1 | 11/2016 | Burrows |
| 2016/0367066 A1 | 12/2016 | Brandsma et al. |
| 2017/0135516 A1 | 5/2017 | Fantappie |
| 2017/0354169 A1* | 12/2017 | Van De Sluis ........... A23L 2/52 |
| 2019/0016579 A1 | 1/2019 | Krüger |
| 2019/0127200 A1 | 5/2019 | Krüger et al. |
| 2019/0233273 A1 | 8/2019 | Krüger et al. |
| 2019/0241421 A1 | 8/2019 | Krüger et al. |
| 2019/0248639 A1 | 8/2019 | Krüger et al. |

FOREIGN PATENT DOCUMENTS

| | | |
|---|---|---|
| DE | 29825074 U1 | 9/2004 |
| DE | 102009049945 A1 | 4/2011 |
| DE | 102009052513 A1 | 5/2011 |
| EP | 0334572 B1 | 9/1989 |
| EP | 1671568 A2 | 6/2006 |
| EP | 1806314 A1 | 7/2007 |
| EP | 1986934 B1 | 11/2008 |
| EP | 2017219 A1 | 1/2009 |
| EP | 2017221 A1 | 1/2009 |
| EP | 2080454 A1 | 7/2009 |
| EP | 2268175 B1 | 5/2013 |
| EP | 2923772 A1 | 9/2015 |
| GB | 2020631 A | 11/1979 |
| GB | 2033333 A | 5/1980 |
| GB | 2335412 A | 9/1999 |
| GB | 2416757 A | 2/2006 |
| JP | H01226387 A | 9/1989 |
| JP | H0279300 U | 6/1990 |
| JP | H05270592 A | 10/1993 |
| JP | H10245099 A | 9/1998 |
| JP | 2006-516398 A | 7/2006 |
| JP | 2008-21294 A | 1/2008 |
| JP | 2008-516862 A | 5/2008 |
| JP | 2010-533626 A | 10/2010 |
| JP | 3164948 U | 12/2010 |
| JP | 2011-235905 A | 11/2011 |
| JP | 2014-076814 A | 5/2014 |
| JP | 2015-13464 A | 7/2015 |
| RU | 2346882 C2 | 1/2006 |
| RU | 2426687 C2 | 8/2011 |
| RU | 2460451 C2 | 9/2012 |
| RU | 2474378 C2 | 2/2013 |
| TW | 2009/09334 A | 3/2009 |
| WO | 81/00098 | 1/1981 |
| WO | 9106221 A1 | 5/1991 |
| WO | 1996/36556 A1 | 11/1996 |
| WO | 98/05586 A1 | 2/1998 |
| WO | 01/21292 A1 | 3/2001 |
| WO | 2004/067386 A2 | 8/2004 |
| WO | 2004/099060 A2 | 11/2004 |
| WO | 2005/079361 A2 | 9/2005 |
| WO | 2006/005401 A2 | 1/2006 |
| WO | 2007/035820 A2 | 3/2007 |
| WO | 2011/084603 A1 | 7/2011 |
| WO | 2013/036564 A2 | 3/2013 |
| WO | 2014/200481 A1 | 12/2014 |
| WO | 2015/094774 A1 | 6/2015 |
| WO | 2016/034592 A1 | 3/2016 |
| WO | 2016/142157 A1 | 9/2016 |

OTHER PUBLICATIONS

European Search Report for European Application No. 19157794, dated Jun. 13, 2019.
European Search Report for European Application No. 19157792, dated Jun. 14, 2019.
International Search Report for International Application PCT/EP2017/050567, dated Apr. 24, 2017.
Written Opinion for International Application PCT/EP2017/050567, dated Apr. 24, 2017.
International Preliminary Report On Patentability for International Application PCT/EP2017/050567, dated Mar. 21, 2018.
Non-Final Office Action dated Apr. 19, 2022, for U.S. Appl. No. 16/069,627.

* cited by examiner

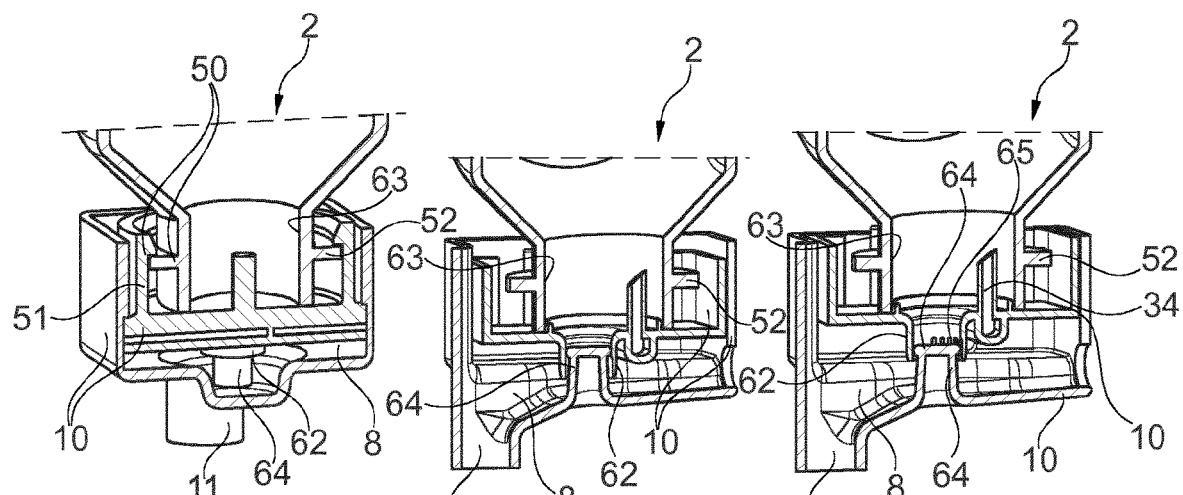
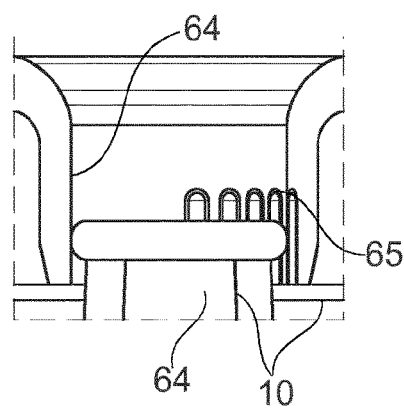
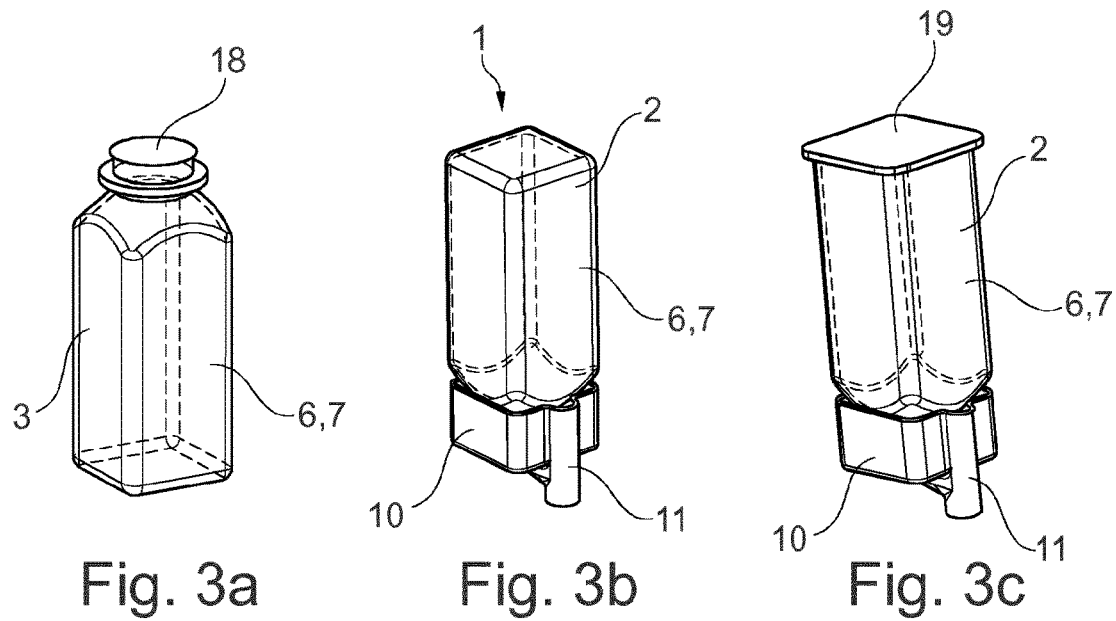

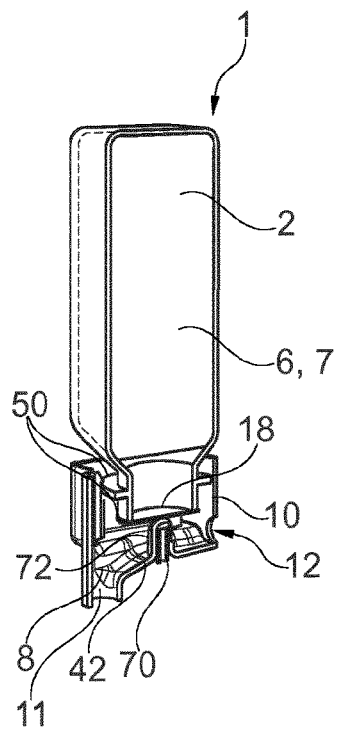
Fig. 3d
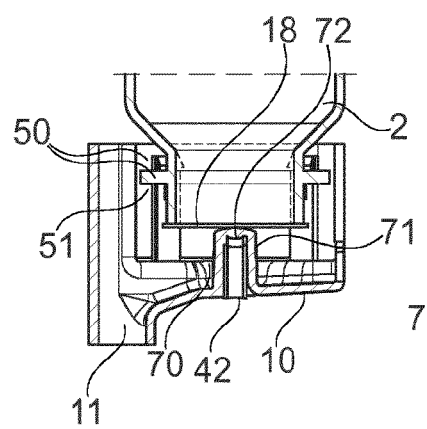 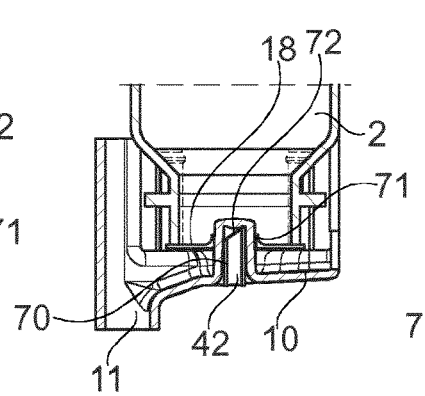 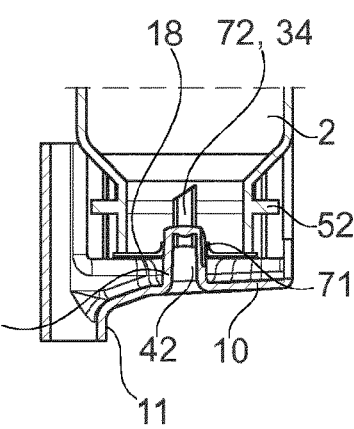
Fig. 3e　　　Fig. 3f　　　Fig. 3g

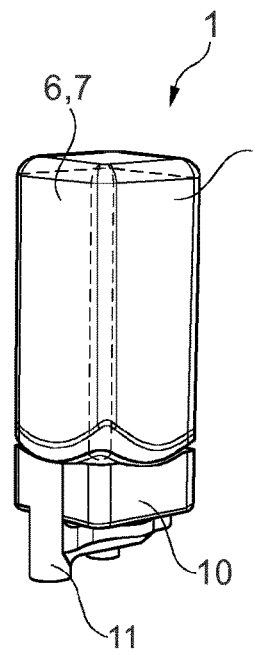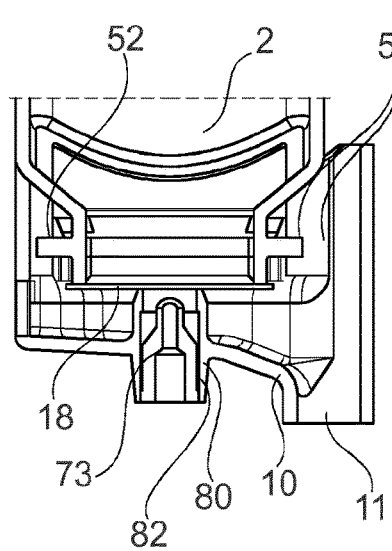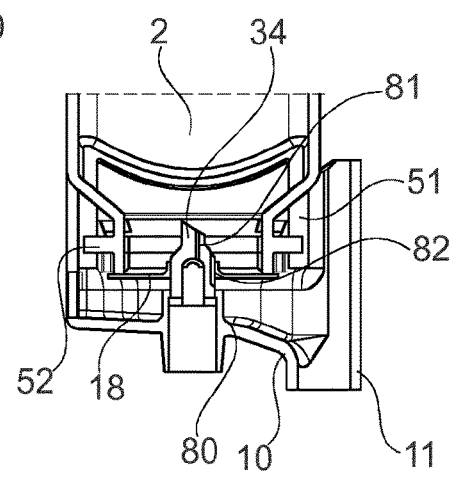
Fig. 4a    Fig. 4b    Fig. 4c
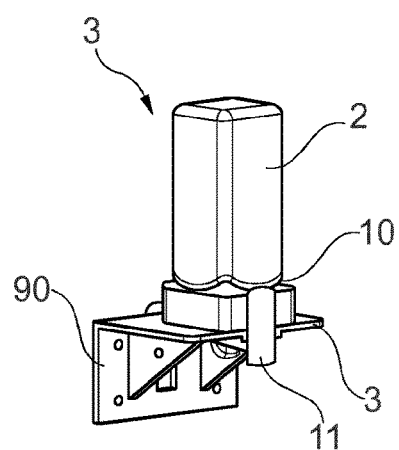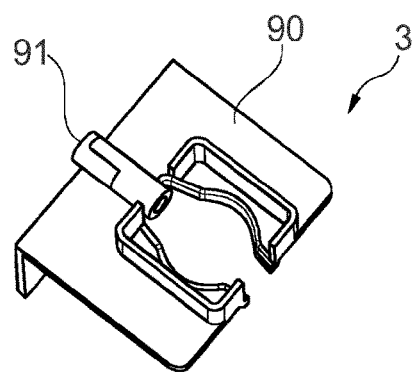
Fig. 5a    Fig. 5b

CARTRIDGE RECEIVER, CARTRIDGE SYSTEM, DRINK PREPARATION MACHINE AND METHOD FOR PRODUCING A DRINK

BACKGROUND

The present invention proceeds from a cartridge system, insertable into a beverage preparation machine, for producing a beverage, in particular a cold beverage, having a cartridge which has a reservoir filled with a beverage substance, and a cartridge receptacle which is reversibly connectable to the cartridge and into which the cartridge is reversibly insertable, and having a cartridge emptying device which effects an at least partial transfer of the beverage substance from the reservoir into a mixing chamber.

Such systems are known in principle from the prior art, for example from EP 1 806 314 A1 and US 2002/130140 A1, and are used to produce beverages from pre-portioned cartridges. The production of beverages with such systems is extremely convenient for the user since he merely has to insert a cartridge and press a start button. The beverage preparation machine then undertakes the production thereof in a fully automated manner, i.e., in particular, the beverage substance is blended with a predetermined quantity of liquid, in particular cold and carbonated water, and conveyed into a drinking vessel. In this way, in particular mixed drinks can be produced much more easily, quickly and with less effort for the user. The user can choose from a large number of different cartridges here, and so he can produce different beverages as desired.

A major challenge with such systems is that of reliably and completely preventing back-contamination of the beverage preparation machine during the production of the beverage, since otherwise there is the risk of soiling through to mold formation within the beverage preparation machine. This goes in particular for cartridges which contain beverage substances containing fructose, alcohol or milk.

In systems known from the prior art, the cartridge is usually inserted into a cartridge receptacle that is configured as a fixed constituent of the beverage preparation machine, and the cartridge is then opened on both sides, i.e. on an inlet side and on an outlet side. On the inlet side, water is subsequently introduced into the cartridge by means of a fluid feed, such that the beverage is already formed within the reservoir in the cartridge by the beverage substance being blended with the water. On the outlet side, the beverage leaves the cartridge and is conveyed to a drinking vessel. The water flows through the reservoir fully in the process and thus causes the beverage substance to be conveyed out of the reservoir.

It has been found that, when the water is introduced directly into the reservoir filled with the beverage substance, back-contamination of the feed cannot be completely prevented because the reservoir is usually completely filled with the beverage substance and, as a result, a considerable rise in pressure takes place in the reservoir upon introduction of the water. Both this rise in pressure in the reservoir and the flushing of the reservoir ensure that, during and/or shortly after the beverage production, very small droplets, particles and/or suspended solids of the beverage substance pass into the fluid feed and result in continuous soiling of the beverage preparation machine there.

SUMMARY

Therefore, it is an object of the present invention to provide a cartridge receptacle, a cartridge system, a beverage preparation machine, and a method for producing a beverage by inserting the cartridge system into a beverage preparation machine, in which back-contamination of the beverage preparation machine is effectively avoided.

This object is achieved by a cartridge receptacle as described herein and a cartridge system as described herein.

The cartridge receptacle according to the invention and the cartridge system according to the invention have, compared with the prior art, the advantage that the fluid feed, unlike in the prior art, does not lead into the reservoir of the cartridge but into the mixing chamber that is separate from the reservoir. This effectively prevents back-contamination of the beverage preparation machine from taking place through the fluid feed in a manner that is simple and cost-effective to realize. For this purpose, the reservoir is not flushed by the fluid but, according to the present invention, the beverage substance and the fluid pass into the mixing chamber separately from one another. The fluid is passed directly into the mixing chamber, while the beverage substance is transferred into the mixing chamber by the cartridge emptying device and independently of the fluid. It has been found that, as a result, back-contamination of the beverage preparation machine is prevented in a much more effective manner compared with the prior art, in particular since no overpressure acting directly on the fluid feed is generated in the reservoir. The configuration of the mixing chamber in the cartridge receptacle, which is reversibly insertable into the beverage preparation machine, advantageously ensures that the mixing chamber is part of the exchangeable cartridge system. In this way, soiling of the beverage preparation machine by the beverage substance is effectively avoided because only parts of the exchangeable disposable or reusable cartridge system come into contact with the beverage substance. It is also conceivable for the cartridge to be exchanged for each beverage production operation, while the cartridge receptacle is used for several beverage production operations before it, too, is exchanged. Preferably, the reservoir of the cartridge system is closed by a sealing element which is opened only during or after the insertion of the cartridge system into the beverage preparation machine. The sealing element serves to close off the cartridge in an aroma-tight manner during transport or storage, with the result that for example a long storage life of the cartridge can be achieved.

Advantageous configurations and developments of the invention can be gathered from the dependent claims, and from the description with reference to the drawings.

According to one preferred embodiment of the present invention, provision is made for the cartridge to be connected fixedly or releasably to the cartridge receptacle or for the cartridge receptacle to be connectable fixedly or releasably to the cartridge. Preferably, the cartridge receptacle is fastened reversibly to the cartridge, particularly preferably by a latching connection. It is conceivable for example for the cartridge to comprise a kind of bottleneck (having the cartridge opening) with a circumferential retaining flange and for the cartridge receptacle to be clip-fastened onto the bottleneck. In the process, in particular elastic latching elements, for example retaining arms, engage behind the retaining flange. The cartridge is provided in particular as a single-use container for the beverage substance, being in particular recyclable. Advantageously, the cartridge receptacle can be used multiple times by being able to be fastened to different cartridges. In addition, the production of the cartridge system is simplified since the cartridge and the cartridge receptacle can be produced separately and the cartridge receptacle is subsequently merely clip-fastened onto the cartridge. The cartridge comprises in particular an angular, round or rounded bottle. The cartridge is produced in particular from plastic in an injection blow-molding process or in an injection-molding process or by other molding processes. In principle, however, a thermoforming process would also be conceivable for producing the cartridge. Likewise, it would, of course, also be conceivable for the cartridge to be usable multiple times.

According to a further preferred embodiment of the present invention, provision is made for the cartridge emptying device to comprise a compressed-air connection for connecting to the compressed-air source, and a compressed-air line which extends from the compressed-air connection to a compressed-air outlet, and wherein the compressed-air outlet protrudes in particular in the direction of the reservoir of the cartridge in order to blow compressed air into the reservoir. The cartridge emptying device integrated into the cartridge receptacle thus comprises, within the meaning of the present invention, first of all only one compressed-air line, through which compressed air can be introduced into the reservoir from the outside. The cartridge system is configured such that the beverage substance is pushed out of the reservoir into the mixing chamber by the compressed air. The compressed air is provided in particular by the beverage preparation machine. It is conceivable for a compressed-air source to be coupled directly to the compressed-air connection as soon as the cartridge system is inserted into the beverage preparation machine. This has the advantage that back-contamination in the direction of the beverage preparation machine is effectively avoided because the cartridge emptying device is immediately under pressure when the cartridge system is inserted and thus beverage substance is prevented from traveling in the direction of the compressed-air line and in particular in the direction of the compressed-air source of the beverage preparation machine. The beverage substance can thus move only in the direction of the mixing chamber from the reservoir.

According to a further preferred embodiment of the present invention, provision is made for the mixing chamber to have a beverage outlet through which the beverage formed from a blend of the beverage substance with the fluid is discharged, wherein the cartridge system is preferably configured such that the beverage is able to be introduced directly into a portable vessel from the beverage outlet. Advantageously, therefore, neither the beverage substance nor the produced beverage comes into contact with any part of the beverage preparation machine, and so any (back-)contamination of the beverage preparation machine is more or less avoided. The fluid is fed to the mixing chamber separately. Preferably, the fluid is introduced into the mixing chamber under pressure. The fluid is provided in particular by the beverage preparation machine. It is conceivable for a fluid source to be coupled directly to a corresponding fluid connection of the cartridge receptacle as soon as the cartridge system is inserted into the beverage preparation machine. The fluid connection is in this case fluidically connected to the mixing chamber via a fluid line. This has the advantage that back-contamination in the direction of the beverage preparation machine is effectively avoided because the fluid connection is immediately under pressure when the cartridge system is inserted and thus beverage substance is prevented from traveling in the direction of the fluid line and in particular in the direction of the fluid source of the beverage preparation machine. The beverage substance and the beverage can thus move only in the direction of the beverage outlet from the mixing chamber. The fluid comprises in particular water, preferably pressurized, cooled and/or carbonated drinking water.

According to one preferred embodiment of the present invention, provision is made for the mixing chamber to be provided with mixing structures. The mixing structures advantageously ensure improved mixing of beverage substance and fluid. For this purpose, the mixing structures are configured in particular such that the fluid flowing into the mixing chamber is swirled. It is conceivable for the mixing structures to comprise one or more mixing ribs which are arranged in the region of the fluid feed at the bottom of the mixing chamber and extend substantially perpendicular to the direction in which the fluid flows in. The mixing ribs thus act as barriers for the fluid, with the result that the fluid is swirled up and better mixing with the beverage substance is achieved.

According to a further preferred embodiment of the present invention, provision is made for the fluid feed to be supplied with fluid which is cooled by a refrigeration unit, wherein the refrigeration unit is part of the beverage preparation machine or of a separate refrigerator operatively connected to the beverage preparation machine. Advantageously, it is thus possible for cold beverages to be produced even when the cartridge is not cooled and is at room temperature for example. The integration of the system into an existing refrigerator has the advantage that the existing refrigeration unit of the refrigerator can be co-used easily in an efficient manner for the beverage preparation machine. In particular, in what are known as "side-by-side" refrigerators (often also referred to as American refrigerators), sufficient installation space for integrating the system can be found in the front. It is conceivable for the beverage preparation machine to be a retrofitting set for such a refrigerator. The refrigeration unit comprises preferably a compressor cooling unit, an absorber cooling unit or a thermoelectric cooler.

According to a further preferred embodiment of the present invention, provision is made for the fluid feed to be supplied with fluid to which carbonic acid is added by a carbonator. It is conceivable for the carbonator to be part of the beverage preparation machine, and wherein the carbonator has a receptacle for a $CO_2$ cartridge and a feeding device for adding $CO_2$ from the $CO_2$ cartridge to the fluid. Advantageously, it is thus also possible to produce carbonated soft drinks with the system. Alternatively, it would also be conceivable for the carbonator to have an external $CO_2$ connection.

According to a further preferred embodiment of the present invention, provision is made for the cartridge receptacle to be formed substantially in one part, or wherein the cartridge receptacle comprises a cover element and an outlet element connected to the cover element. Within the meaning of the present invention, a one-part form of the cartridge receptacle in particular does not mean that the cartridge receptacle has to consist of a single part, but merely that the cartridge receptacle does not consist only of the cover element and separate outlet element in this specific one-part embodiment. In other words: The cover element and outlet element are formed in one part in the one-part embodiment.

According to a further preferred embodiment of the present invention, provision is made for the cover element to be reversibly connectable and in particular latchable to the cartridge such that a cartridge opening leading to the reservoir is closed at least temporarily or partially by the cover element, and wherein the outlet element is reversibly connectable and in particular latchable to the cover element. In order to produce this embodiment of the cartridge system, the cartridge is produced, subsequently the cartridge is filled with the beverage substance through the cartridge opening, and subsequently, in order to close the cartridge opening, the cartridge receptacle is clip-fastened onto the cartridge. In this case, the outlet element has in particular the fluid feed, the compressed-air connection, the mixing chamber, and the beverage outlet, while the cover element has the compressed-air outlet, in particular protruding into the reservoir, for introducing the compressed air into the reservoir. It is conceivable for the compressed-air outlet to comprise a hollow spike which is operatively connected via the compressed-air line to the compressed-air connection formed on the cover element or on the outlet element.

According to a further preferred embodiment of the present invention, provision is made for a fluidic connection between the cartridge opening and the mixing chamber to be able to be established by means of a valve unit, wherein the valve unit is transferable by a relative movement between the cover element and the outlet element from a closed state into an open state in order to establish the fluidic connection. Advantageously, the reservoir can accordingly be opened such that the beverage substance can be transferred from the reservoir into the mixing chamber by means of the compressed air simply by the relative movement between the cover element and outlet element being carried out. This relative movement can take place before or after the cartridge system is inserted into the beverage preparation machine.

Preferably, the cover element has a passage opening leading to the cartridge opening, wherein the valve unit is formed by the passage opening and a protrusion, protruding into the passage opening, of the outlet element, wherein, by way of a relative movement between the cover element and the outlet element, the protrusion is shifted from a position closing the passage opening into a position partially opening up the passage opening. The wall of the passage opening is provided in particular with at least one lateral channel, wherein the protrusion is arranged in the region of the at least one lateral channel in the position partially opening up the passage opening. Preferably, a plurality of lateral channels that are arranged in a parallel manner are provided in the wall of the passage opening. The lateral channels extend perpendicularly to the cross section of the passage opening, but each extend only over a section of the wall. The protrusion has in particular an external peripheral sealing edge which bears against the inner wall of the passage opening in the closing position and thus closes the passage opening. As a result of the relative movement, the protrusion is displaced preferably in a linear manner in the direction of the reservoir or away from the reservoir, such that the external peripheral sealing edge passes into the region of the lateral channels and loses its sealing action, since the beverage substance can flow around the sealing edge, through the lateral channels.

It is conceivable for the cross section of the lateral channels and/or the number of the lateral channels to be adapted to the viscosity of the beverage substance, such that the lateral channels control or limit the flow of the beverage substance in the direction of the mixing chamber. At a high viscosity, a plurality of lateral channels or lateral channels with a relatively large cross section are used, while, at a lower viscosity, fewer lateral channels or lateral channels with a smaller cross section are provided. Consequently, for different types of beverage substances, preferably different cover elements (each with adapted lateral channels) are used. Thus, a matching cover element exists for each cartridge. The protrusion is configured in particular in the form of an anvil, wherein the external peripheral sealing edge forms the cross-sectional enlargement with respect to the base of the anvil.

In the above-described embodiment, the cover element and outlet element are configured as separate parts in order that the relative movement is executable. The relative movement in this case comprises in particular a linear movement of the cover element and of the outlet element toward one another or a linear movement of the cover element and of the outlet element away from one another in order to move the protrusion within the passage opening and relative to the lateral channels.

According to an alternative further preferred embodiment of the present invention, provision is made for the cartridge to have a cartridge opening fluidically connected to the reservoir, wherein the cartridge opening is closed by a sealing element, wherein the sealing element comprises in particular a sealing foil which has been applied to and preferably sealed onto the edge of the cartridge opening. In this embodiment, the cartridge receptacle is configured in particular in one part, i.e. there are no separate outlet and cover elements. In order to produce this cartridge system, first of all the cartridge is created with the cartridge opening, then the cartridge is filled with the beverage substance through the cartridge opening, subsequently the cartridge opening is closed by the sealing element, and finally the cartridge receptacle is clip-fastened onto the cartridge in the region of the closed cartridge opening. Before, during or after the insertion of the cartridge system into the beverage preparation machine, the sealing element has to be opened in the region of the cartridge opening, for example by perforation of the sealing foil, in order that the beverage substance can be transferred from the reservoir into the mixing chamber by introduction of the compressed air. Preferably, to this end, the cartridge receptacle has a piercing spike that protrudes in the direction of the cartridge, such that, as a result of a relative movement between the cartridge receptacle and the cartridge, the piercing spike pierces the sealing element and a fluidic connection between the reservoir and the mixing chamber is created. It is conceivable for the cartridge to first of all sit in a preliminary position within the cartridge receptacle, in which the piercing spike is away from the sealing element, and, after the cartridge system has been introduced into the beverage preparation machine, to be transferred from the preliminary position into an end position in which the piercing spike pierces the sealing element. When the cartridge system is transferred from the preliminary position into the end position, the cartridge and the cartridge receptacle are moved further toward one another, in particular in translation, wherein the sealing element is actively pierced by the piercing spike during this movement. Subsequently, the piercing spike projects through the sealing element in the direction of the cartridge opening. Preferably, at least one lateral channel for conveying the beverage substance in the direction of the mixing chamber when the sealing element has been pierced has been introduced into the wall of the piercing spike. Through the lateral channel formed laterally on the piercing spike, the beverage substance can then flow past the sealing element in the direction of the mixing chamber. Preferably, a plurality of lateral channels are formed on the piercing spike. The lateral channels are in particular each configured in the form of a groove that is open on one side.

It is conceivable for the cross section of the lateral channels and/or the number of the lateral channels to be adapted to the viscosity of the beverage substance, such that the lateral channels control or limit the flow of the beverage substance in the direction of the mixing chamber. At a high viscosity, a plurality of lateral channels or lateral channels with a relatively large cross section are used, while, at a lower viscosity, fewer lateral channels or lateral channels with a smaller cross section are provided. Thus, a matching cartridge receptacle exists for each cartridge.

Preferably, the piercing spike has a through-hole in which a compressed-air tip is mounted so as to be displaceable between a retracted position, in which the compressed-air tip does not project beyond the piercing spike in the direction of the reservoir, and an extended position, in which the compressed-air tip projects beyond the piercing spike and into the reservoir. Preferably, the compressed-air tip is transferred from the retracted position in the direction of the extended position after the sealing element has been perforated by the piercing spike. With the aid of the compressed-air tip, compressed air is then introduced into the reservoir such that the beverage substance is pushed into the mixing chamber through the grooves and forms the beverage with the fluid within the mixing chamber. Preferably, for this purpose, the compressed-air line is integrated into the compressed-air tip. On a side of the compressed-air tip that is in particular remote from the reservoir, the compressed-air connection is formed, wherein the compressed-air connection is preferably accessible from outside the cartridge receptacle and can thus be connected to the compressed-air source of the beverage preparation machine. It is conceivable for the compressed-air tip to be transferred from the retracted position into the extended position by a release element of the beverage preparation machine when the cartridge system is inserted into the beverage preparation machine. Preferably, compressed air is already applied to the compressed-air tip in this case, in order to prevent any back-contamination. Alternatively, the compressed-air tip is moved from the retracted position into the extended position by the compressed air applied via the beverage preparation machine.

In an alternative form of the above-described embodiment, the piercing spike is not configured in a manner fixed to or in one piece with the cartridge receptacle, but rather the cartridge receptacle comprises a spike guide and a piercing spike mounted in a displaceable manner within the spike guide. The piercing spike is mounted so as to be displaceable with respect to the spike guide between a retracted position, in which the piercing spike is away from the sealing element, and an extended position, in which the piercing spike pierces the sealing element and projects into the reservoir. The outer wall of the piercing spike is in turn provided with at least one lateral channel for conveying the beverage substance in the direction of the mixing chamber when the sealing element has been pierced. Through the lateral channel formed laterally on the piercing spike, the beverage substance can then flow past the sealing element in the direction of the mixing chamber. Preferably, a plurality of lateral channels are formed on the piercing spike. The lateral channels are in particular each configured in the form of a groove that is open on one side.

It is also conceivable in this embodiment for the cross section of the lateral channels and/or the number of the lateral channels to be adapted to the viscosity of the beverage substance, such that the lateral channels control or limit the flow of the beverage substance in the direction of the mixing chamber. At a high viscosity, a plurality of lateral channels or lateral channels with a relatively large cross section are used, while, at a lower viscosity, fewer lateral channels or lateral channels with a smaller cross section are provided. Thus, a matching cartridge receptacle exists for each cartridge.

Preferably, the compressed-air line is integrated into the piercing spike in this alternative form, too. The piercing spike does not have a movable compressed-air tip, however, but rather the compressed-air line leads into the cartridge opening through a fixed compressed-air tip at the end of the piercing spike. On a side of the piercing spike that is in particular remote from the reservoir, the compressed-air connection is formed, wherein the compressed-air connection is accessible preferably from outside the cartridge receptacle. Preferably, the piercing spike is transferred from the retracted position into the extended position by a release element of the beverage preparation machine when the cartridge system is inserted into the beverage preparation machine. Preferably, compressed air is already applied to the compressed-air tip in this case, in order to prevent any back-contamination of the beverage preparation machine. Alternatively, the compressed-air tip is moved from the retracted position into the extended position by the compressed air applied via the beverage preparation machine.

According to a preferred further embodiment of the present invention, provision is made for the cartridge to have a further cartridge opening on an opposite side from the cartridge opening, said further cartridge opening being closed by a further sealing element, in particular a further sealing foil. Advantageously, the cartridge can thus also be produced in a favorable injection-molding process.

According to a preferred embodiment of the present invention, provision is made for the cartridge and/or the cartridge receptacle to have a product identifier and for the beverage preparation machine or the cartridge receptacle to have an identifier detector for identifying the product identifier. Preferably, the product identifier is embedded in a barcode, an RFID code, a QR code, a data matrix code, a color code, a hologram code or the like. Advantageously, automated reading of the product identifier is thus possible. The identifier detector comprises in particular an optical sensor, for example a CCD camera, which automatically reads the barcode or QR code or data matrix code when the cartridge has been inserted into the beverage preparation machine. Alternatively, the identifier detector comprises a transceiver antenna for automatically reading the RFID codes. Alternatively, it would be conceivable for the product identifier also to be embedded in other automatically readable computer chips. The term QR code includes, within the meaning of the present invention, in particular any data matrix code. In this regard, the terms QR code and data matrix code are used synonymously. Alternatively or additionally, it would also be conceivable for the product identifier to comprise a barcode, a dot code, a binary code, a Morse code, Braille code (embossed printing) or the like. The code can in this case also be embedded in a three-dimensional structure, for example a relief. The product identifier comprises in particular what is known as the product identification number, in particular a Universal Product Code (UPC), a European Article Number (EAN), a GS1 code, a Global Trade Item Number (GTIN) or the like. In this way, it is not necessary for a new code system to be introduced. In particular, the product identifier is covered by the GS1 standard.

The product identifier serves in particular to specify the beverage substance located in the cartridge. During or before the start of the beverage preparation process, the product identifier is read with the identifier detector. Thus, the beverage preparation machine knows which type of cartridge has been introduced into the beverage preparation machine. It is conceivable for an evaluation and control unit of the beverage preparation machine to have a multiplicity of prestored beverage production programs which are provided for the preparation of different beverages and differ from one another for example in terms of the delivery rate, delivery time, delivery pauses, temperature, degree of carbonation and/or pressure of the fluid fed. It is also conceivable for different compressed-air feeds (for example at different pressures) to be used in different beverage production programs. Each beverage production program is linked to one or more product identifiers. When a cartridge is introduced into the beverage preparation machine, the product identifier on the cartridge is read with the identifier detector and then compared with the prestored data. Using the product identifier, a beverage production program is thus selected from the plurality of prestored beverage production programs and subsequently the beverage production process with the selected beverage production program is started. The parameters such as delivery rate, delivery time, delivery pauses, temperature, degree of carbonation and/or pressure of the fluid fed are predetermined or controlled by the selected beverage production program in order to achieve optimal results for the beverage to be produced with the particular beverage substance.

It is conceivable for the beverage production process not to start at all when a product identifier is not identifiable or the identified product identifier does not match any prestored beverage production program. This prevents a system-incompatible cartridge from being used in the beverage production machine, which is not certified for operation in the beverage production machine, with the result that there would be the risk of damage to the beverage production machine or a hazard to the user, for example by bursting of the cartridge (when the latter is intended for operation at lower pressures).

The product identifier is preferably printed or stuck on the wall of the cartridge or on the sealing element (in particular the sealing foil) for sealing off the cartridge opening. In particular, the product identifier is positioned on the cartridge such that the product identifier is arranged within the range of detection of the identifier detector of the beverage preparation machine when the cartridge has been inserted into the beverage preparation machine. Alternatively, it would also be conceivable for the product identifier not to be arranged on the cartridge but in an appropriate manner on an outer wall of the cartridge receptacle.

A further subject of the present invention for achieving the object stated at the beginning is a beverage preparation machine into which the cartridge system according to the invention is insertable, wherein the beverage preparation machine has a retaining unit into which the cartridge receptacle connected to the cartridge is insertable, a fluid source for injecting the fluid into the fluid feed, and a compressed-air source for blowing compressed air into the compressed-air connection. Preferably, the beverage preparation machine has the release element for transferring the compressed-air tip or the piercing spike from the retracted position into the extended position.

Preferably, the beverage preparation machine has the evaluation and control unit, which is coupled to the identifier detector and is intended to determine the product identifier by analyzing the detected QR code. Preferably, the evaluation electronics determine from the QR code the GS1 code, which allows unambiguous identification of the cartridge arranged in the beverage preparation machine. The beverage preparation machine furthermore preferably has a comparison unit which is intended to compare the determined product identifier with a list of prestored product identifiers and selects a beverage production program on the basis of the comparison. Alternatively, it is conceivable for the beverage preparation machine to have an algorithm identification means which uses an algorithm to identify whether the detected QR code belongs to the system (i.e. is known) or is system-incompatible. The algorithm in this case functions in accordance with the known cryptographic encryption/decryption methods.

A further subject of the present invention for achieving the object stated at the beginning is a method for producing a beverage with the cartridge system according to the invention, having the following steps: inserting the cartridge system into a retaining unit of a beverage preparation machine; transferring the beverage substance from the reservoir of the cartridge into the mixing chamber of the cartridge receptacle by means of the cartridge emptying device; injecting a fluid into the mixing chamber by means of the fluid feed; and discharging the beverage created in the mixing chamber by blending the beverage substance with the fluid, by means of a beverage outlet. Preferably, in the process, the beverage substance is transferred from the reservoir into the mixing chamber by compressed air.

Preferably, before being injected into the mixing chamber, the fluid is cooled and/or carbonated, such that cold beverages and carbonated soft drinks are producible.

According to a preferred further embodiment of the present invention provision is made, before, during or after the insertion of the cartridge system into the retaining unit, for a compressed-air tip or the piercing spike to be transferred from a retracted position into an extended position and to perforate a sealing element at the cartridge opening. Advantageously, the reservoir is thus opened automatically, such that the beverage substance can be transferred into the mixing chamber. Preferably, during the opening operation, compressed air and fluid are already introduced into the cartridge receptacle, such that back-contamination of the beverage preparation machine by beverage substance is prevented. The compressed-air tip and/or the piercing spike are transferred in particular by a driven actuator or by compressed air.

According to a preferred alternative embodiment of the present invention, provision is made, before, during or after the insertion of the cartridge system into the retaining unit, for a fluidic connection to be established between the reservoir and the mixing chamber by a valve unit being opened by way of a relative movement between a cover element and an outlet element. Advantageously, the reservoir is thus opened automatically, such that the beverage substance can be transferred into the mixing chamber. Preferably, during the valve opening operation, compressed air and fluid are already introduced into the cartridge receptacle, such that back-contamination of the beverage preparation machine by beverage substance is prevented. The relative movement is brought about in particular by a driven actuator or by compressed air.

Further details, features and advantages of the invention are apparent from the drawings, and from the following description of preferred embodiments with reference to the drawings. The drawings illustrate merely exemplary embodiments of the invention which do not limit the essential concept of the invention.

BRIEF DESCRIPTION OF THE DRAWINGS

FIGS. 2a to 2h show schematic views of a cartridge receptacle and of a cartridge system according to a first embodiment of the present invention.

FIGS. 3a to 3g show schematic views of a cartridge receptacle and of a cartridge system according to a second embodiment of the present invention.

FIGS. 4a to 4c show schematic views of a cartridge receptacle and of a cartridge system according to a third embodiment of the present invention.

FIGS. 5a and 5b show schematic views of a cartridge receptacle and of a cartridge system inserted into a retaining unit of a beverage preparation machine according to a third embodiment of the present invention.

DETAILED DESCRIPTION

In the various figures, identical parts are always provided with the same reference signs and are therefore each generally also mentioned only once.

Figure 1:
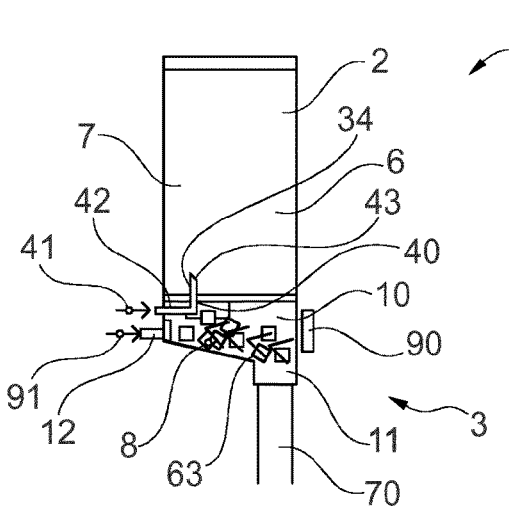
FIG. 1 shows the basic principle of the method for producing a beverage with a cartridge receptacle and a cartridge system inserted into a beverage preparation machine according to one exemplary embodiment of the present invention.
Figures 2A, 2B, 2C:
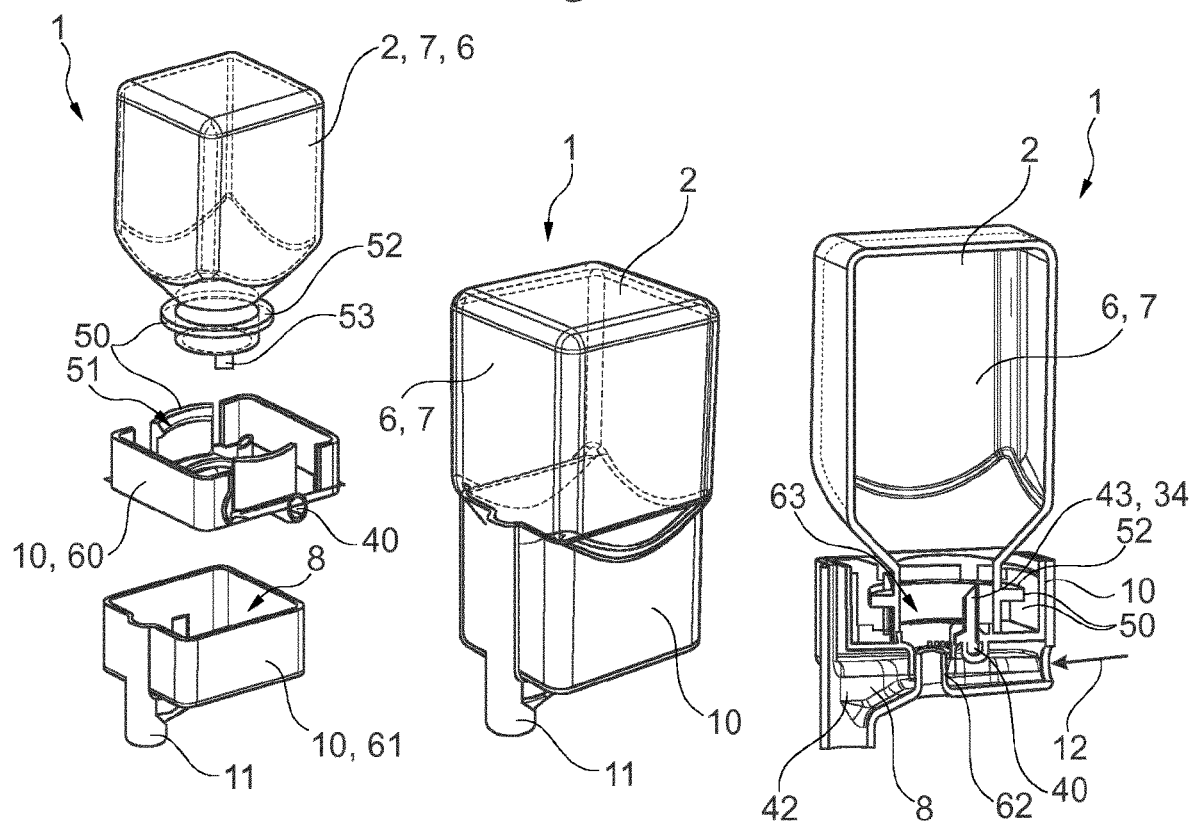

FIG. 1 shows a schematic cross-sectional view of a cartridge system 1 according to the invention, which has been inserted into a beverage preparation machine 3 and by means of which a beverage 70 is prepared, in order to illustrate the general operating principle.

The present system comprises the beverage preparation machine 3 (illustrated only schematically), into which exchangeable cartridge systems 1 are insertable. Each cartridge system 2 has a cartridge 2 which is filled with a particular beverage substance 7. Within the beverage preparation machine 3, a corresponding beverage 70 is created with the aid of the beverage substance 7 and an additional water source, referred to as fluid source 41 in the following text. The cartridge 2 is in this case preferably filled with a pre-portioned quantity of beverage substance 7 which is necessary for creating a specific drinking portion, for example a drinking glass filling of the desired beverage 70. In particular a plurality of different cartridge systems 1 are available, the cartridges 2 or reservoirs 6 of which are filled with different beverage substances 7 for producing different beverages 70. When the user of the system 1 wishes to drink a particular beverage 70, all he needs to do is choose, from the plurality of different cartridge systems 1, that cartridge system 1 which contains the corresponding beverage substance 7 for producing the desired beverage 70, insert it into a retaining unit 90 of the beverage preparation machine 3 and if appropriate start the beverage production process at the beverage preparation machine 3, for example by pressing a start button, by touching a touch sensitive display in an appropriate manner, by gesture or voice control, or by means of a suitable application on a cell phone. It is also conceivable for the beverage production process to start automatically when the insertion of a new cartridge system 1 into the retaining unit 90 is detected. In each of the abovementioned cases, the desired beverage 70 is then produced automatically, conveyed into a drinking vessel and thus provided to the user. Subsequently, the used-up cartridge system 1 is removed and disposed of. The beverage preparation machine 3 is now ready once again to be filled with any desired new cartridge system 1 in order to produce a further beverage 70.

The beverage substance 7 comprises preferably liquid premixing constituents for soft drinks, such as caffeinated, carbonated, fruity and/or sugary sodas and juices, beer (mixed) drinks, or other alcoholic or nonalcoholic (mixed) drinks.

The cartridge system 1 comprises a cartridge 2 in the form of a cylindrical container with rounded corners. The container is hollow and thus contains a reservoir 6 for the beverage substance 7. The cartridge 2 is produced in particular from plastic and by an injection blow-molding process. The cartridge 2 also has a cartridge opening 63 through which the reservoir 6 is filled with the liquid beverage substance 7. The bottom of the reservoir 6 is configured in a funnel-shaped manner in the present example, wherein the cartridge opening 63 is arranged in the center of the funnel-shaped bottom. The cartridge 2 is reversibly connected to a cartridge receptacle 10 according to the invention which is connected to the cartridge 2 by means of a latching connection 50 in the region of the cartridge opening 63 after the filling of the cartridge 2. The cartridge receptacle 10 to this end has lateral latching elements 51 in the form of elastic retaining arms, which engage around a circumferential retaining flange 52, arranged in the region of the cartridge opening 63, of the cartridge 2. The cartridge receptacle 10 is clip-fastened onto the cartridge 2 after the filling of the cartridge 2.

The cartridge receptacle 10 has a mixing chamber 8 which is fluidically connected to the reservoir 6 during the beverage production process, such that, with the aid of a cartridge emptying device 34 of the cartridge receptacle 10, the beverage substance 7 can be transferred at least partially out of the reservoir 6 into the mixing chamber 8. The cartridge emptying device 34 to this end comprises a compressed-air line 40. One end of the compressed-air line 40 is connected to a compressed-air connection 42 which can be connected to a compressed-air source 41 of the beverage preparation machine 3 in order to introduce compressed air into the compressed-air line 40, while the other end leads into a compressed-air outlet 43 which is open in the direction of the reservoir 6 and introduces compressed air into the reservoir 6. The introduction of the compressed air causes the beverage substance 7 to be pushed into the mixing chamber 8.

A fluid feed 12 of the cartridge receptacle 10, which is supplied by a fluid source 91 of the beverage preparation machine 3, also leads into the mixing chamber 8. It is conceivable for the fluid feed 12 to have a quick coupling, by way of which the fluid feed 12 can be connected to the fluid source 91 of the beverage preparation machine 3. The quick coupling can be configured for example such that, when the cartridge system 1 is inserted into the retaining unit 90, a fluidic connection is automatically established between the fluid source 91 and the mixing chamber 8 via the fluid feed 12. During the beverage production process, fluid, in particular cooled and carbonated drinking water, passes from the fluid feed 12 into the mixing chamber 8 via this fluidic connection. Furthermore, during the beverage production process, beverage substance 7 passes from the reservoir 6 into the mixing chamber 8, as described above. As a result of the beverage substance 7 being blended with the fluid in the mixing chamber 8, the beverage 70 is formed, which then leaves the mixing chamber 8 through a beverage outlet 11.

The cartridge receptacle 10 has the beverage outlet 11, through which the beverage 70 produced within the mixing chamber 8 leaves the mixing chamber 8, and is conveyed in particular directly into the drinking vessel (not depicted), i.e. without parts of the beverage preparation machine 3 coming into contact with the beverage 70. In this way, back-contamination of the beverage preparation machine 3 is prevented. The drinking vessel is arranged in particular directly beneath the beverage outlet 11.

Following completion of the beverage production process, the cartridge system 1 is removed from the retaining unit 90, such that the beverage production machine 3 can be fitted with a new and unused cartridge system 1. The cartridge receptacle 10 can be reused by being separated from the used cartridge 2 by releasing the latching connection 50, and being clip-fastened onto a new cartridge 2.

Three different embodiments of the cartridge system 1 are described in the following text. The three different embodiments differ in particular in that the cartridge receptacle 10 is configured in different ways and the mechanism for establishing the fluidic connection between the reservoir 6 and the mixing chamber 8 is configured in different ways; otherwise, all three embodiments correspond substantially to the cartridge system 1 illustrated above by way of FIG. 1.

FIGS. 2a to 2h illustrate schematic views of a cartridge receptacle 10 and of a cartridge system 1 according to a first embodiment of the present invention.

In this first embodiment, the cartridge receptacle 10 comprises a cover element 60 and a separate outlet element 61. The cover element 60 is clip-fastened directly onto the cartridge 2 by means of the releasable latching connection 50 explained above. The outlet element 61 is also clip-fastened onto the cover element 60, likewise by way of a releasable latching connection. The mixing chamber 8 and the beverage outlet 11 are integrated into the outlet element 61. Formed between the cover element 60 and the outlet element 61 is a valve unit which closes the cartridge opening 63 and opens only during the beverage production process in order to allow the beverage substance 7 to be transferred into the mixing chamber 8. During the beverage production process, the valve unit also acts as a flow control, which limits or controls the flow of beverage substance 7 into the mixing chamber 8.

To form the valve unit, the cover element 60 comprises a central passage opening 62 which is arranged in the region of the open cartridge opening 63 and is thus fluidically connected directly to the reservoir 6. The outlet element 61 has a protrusion 64 which protrudes into the passage opening 62. The protrusion 64 is configured in the form of an anvil and comprises an external peripheral sealing edge which forms a cross-sectional enlargement with respect to the base of the anvil. By way of a relative movement between the cover element 60 and the outlet element 61, the protrusion 64 is shifted from a position closing the passage opening 62 into a position partially opening up the passage opening 62. In the closing position, the sealing edge bears flat against the inner wall of the passage opening 62, such that the passage opening 63 is closed for beverage substance 7. As a result of the relative movement, in the present example, the protrusion 63 is shifted linearly away from the reservoir 6 and in the direction of the mixing chamber 8, such that the external peripheral sealing edge passes into a region of the passage opening 63 which is provided with a plurality of parallel lateral channels 82. The sealing action of the sealing edge is thus eliminated since the beverage substance 7 can now flow around the sealing edge, through the lateral channels 82, in the direction of the mixing chamber 8. The lateral channels 82 extend in a linear direction in the wall of the passage opening 63 and each comprise a groove that is open on one side. The lateral channels 82 accordingly extend perpendicularly to the cross section of the passage opening 63, but each extend only over a section of the wall, in order that the position closing the passage opening 62 and the position partially opening up the passage opening 62 are realized.

The cross section of the lateral channels 82 and/or the number of the lateral channels 82 is preferably adapted to the viscosity of the beverage substance 7, such that the lateral channels 82 control or limit the flow of the beverage substance 7 in the direction of the mixing chamber 8. At a high viscosity, a plurality of lateral channels 82 and/or lateral channels 82 with a relatively large cross section are used, while, at a lower viscosity, fewer lateral channels 82 and/or lateral channels 82 with a smaller cross section are provided.

The relative movement between the cover element 60 and outlet element 61 is carried out either manually before the insertion of the cartridge system 1 into the beverage preparation machine 3 or automatically during or after the insertion of the cartridge system 1 into the beverage preparation machine 3.

In order that the beverage production process proceeds rapidly, the transfer of the beverage substance 7 from the reservoir 6 into the mixing chamber 8 is supported by the cartridge emptying device 34. The cartridge emptying device 34 comprises, in the present example, a compressed-air outlet 43, which is configured in the form of a hollow spike protruding into the cartridge opening 63. By way of this spike, compressed air is blown into the reservoir 6, said compressed air causing the beverage substance 7 to pass out through the lateral channels 82 to the mixing chamber 8, or accelerating this. The compressed air is provided by the beverage preparation machine 3 and introduced into the cartridge receptacle 10 via a compressed-air connection 42, and conveyed to the hollow spike by means of a compressed-air line 40. The hollow spike is part of the cover element 60, while the compressed-air connection 42 and the compressed-air line 40 can optionally be formed either in the cover element 60 or in the outlet element 61. The hollow spike as part of the cover element 60 is thus already fluidically connected to the reservoir 6 before the passage opening 62 is opened. The mixing chamber 8 additionally has the separate fluid feed 12, through which the mixing chamber 8 is supplied with in particular cooled and/or carbonated drinking water. The fluid feed 12 is, in the present example, part of the outlet element 61.

Preferably, both the fluid source 91 and the compressed-air source 41 are coupled directly to the fluid feed 12 and to the compressed-air connection 42, respectively, as soon as the cartridge system 1 is inserted into the beverage preparation machine 3 or a beverage production process is started, and in particular before the passage opening 62 is opened. In this way, back-contamination in the direction of the beverage preparation machine 3 is effectively avoided because the fluid feed 12 and the cartridge emptying device 34 are immediately under overpressure upon insertion of the cartridge system 1, and this prevents the beverage substance 7 from traveling in the direction of the fluid source 91 and compressed-air source 41, respectively. The beverage substance 7 can thus move only in the direction of the mixing chamber 8 from the reservoir 6 as soon as the passage opening 62 is opened.

FIGS. 3a to 3g illustrate schematic views of a cartridge receptacle 10 and of a cartridge system 1 according to a second embodiment of the present invention.

The second embodiment differs from the first embodiment in that the cartridge receptacle 10 is no longer embodied in two parts (separate cover element 60 and outlet element 61) but in one part, i.e. the cover element 60 and outlet element 61 are configured as a common part (the cartridge receptacle 10), which is clip-fastened onto the cartridge 2 in the above-described manner and has the mixing chamber 8, beverage outlet 11, cartridge emptying device 34, and fluid feed 12. In order that the cartridge 2 is closed in an aroma-tight manner during the storage and transport of the cartridge system 1, in the present embodiment, the cartridge opening 63 is closed with a sealing element 18 in the form of a thin sealing foil. Following the production of the cartridge 2 in the injection blow-molding process, the sealing foil is adhesively bonded or sealed onto the edge of the cartridge opening 63 (see FIG. 3a). Only then is the cartridge receptacle 10 clip-fastened onto the cartridge 2 (see FIG. 3b).

FIG. 3c shows an alternative in which the cartridge 2 has not been produced in an injection blow-molding process but in an injection-molding process. The cartridge 2 in this case has a further cartridge opening which is closed by a further sealing foil 19 in that the further sealing foil 19 is sealed onto the edge of the further cartridge opening in an analogous manner. Since two sealing steps are necessary in this case, this alternative is less preferred, however. FIGS. 3d to 3g are therefore based on the cartridge 2 shown in FIGS. 3a and 3b again.

The cartridge receptacle 10 now has, in the second embodiment, a fixed piercing spike 73, which protrudes in the direction of the cartridge 2. As a result of a relative movement between the cartridge 2 and the receiving element 10 toward one another, the piercing spike 73 pierces the sealing element 18. After the production of the cartridge system 1, the cartridge 2 initially sits in a preliminary position within the cartridge receptacle 10, in which the piercing spike 73 is away from the sealing element 18. It is only immediately before, during or immediately after the introduction of the cartridge system 1 into the beverage preparation machine 3 or immediately after the initiation of the beverage production process that the cartridge 2 is transferred from this preliminary position into an end position in which the piercing spike 73 penetrates the sealing element 18. When the cartridge 2 is transferred from the preliminary position into the end position, the cartridge 2 and the cartridge receptacle 10 are moved further toward one another in translation, wherein the sealing element 18 is actively pierced by the piercing spike 73 during this movement (cf. FIG. 3e =>FIG. 3f). The piercing spike 73 subsequently projects through the sealing element 18 in the cartridge opening 63 in the direction of the reservoir 6. Introduced into the outer side of the piercing spike 73 are a plurality of lateral channels 71 which are configured in the form of grooves that are open on one side and extend parallel to one another. Following the piercing of the sealing element 18, the lateral channels 71 become fluidically connected to the reservoir 6, such that the beverage substance 7 can flow around the edges of the pierced sealing element 18 in the direction of the mixing chamber 8.

In this embodiment, too, the cross section of the lateral channels 71 and/or the number of the lateral channels 71 is preferably adapted to the viscosity of the beverage substance 7, such that the lateral channels 71 control or limit the flow of the beverage substance 7 in the direction of the mixing chamber 8. At a high viscosity, a plurality of lateral channels 71 and/or lateral channels 71 with a relatively large cross section are used, while, at a lower viscosity, fewer lateral channels 71 and/or lateral channels 71 with a smaller cross section are provided.

The piercing spike 73 has a through-hole in which a compressed-air tip 72 is arranged in a movable manner. The compressed-air tip 72 can be shifted between a retracted position, in which the compressed-air tip 72 does not project beyond the piercing spike 73 in the direction of the reservoir 6 (illustrated in FIG. 3f), and an extended position, in which the compressed-air tip 72 projects beyond the piercing spike 73 into the cartridge opening 62 or into the reservoir 6 (illustrated in FIG. 3g). Integrated into the compressed-air tip 72 is the compressed-air line 40, which is connected to the compressed-air connection 42. On a side of the compressed-air tip 72 that is in particular remote from the reservoir 6, the compressed-air connection 42 is formed, such that it is accessible from outside the cartridge receptacle 10 and can be connected directly to the compressed-air source 41 of the beverage preparation machine 3.

The compressed-air tip 72 is transferred from the retracted position in the direction of the extended position after the sealing element 18 has been perforated by the piercing spike 73. With the aid of the compressed-air tip 72, compressed air is then blown into the reservoir 6 such that the beverage substance 7 is pushed through the lateral channels 71 into the mixing chamber 8. Within the mixing chamber 8, the beverage substance 7 is blended with the fluid and thus forms the beverage 70. It is conceivable for the compressed-air tip 72 to be transferred from the retracted position into the extended position when or after the cartridge system 1 is inserted into the beverage preparation machine 3 or after the start of the beverage production process. This takes place in particular by compressed air being applied to the compressed-air tip 72 with the result that the compressed-air tip 72 is shifted from the retracted position into the extended position.

Preferably, both the fluid source 91 and the compressed-air source 41 are coupled directly to the fluid feed 12 and to the compressed-air connection 42, respectively, as soon as the cartridge system 1 is inserted into the beverage preparation machine 3 or a beverage production process is started, and in particular before the sealing element 18 is opened. In this way, back-contamination in the direction of the beverage preparation machine 3 is effectively avoided because the fluid feed 12 and the cartridge emptying device 34 are immediately under overpressure upon insertion of the cartridge system 1, and this prevents the beverage substance 7 from traveling in the direction of the fluid source 91 and compressed-air source 41, respectively. The beverage substance 7 can thus move only in the direction of the mixing chamber 8 from the reservoir 6 as soon as the sealing element 18 is opened.

FIGS. 4a to 4c illustrate schematic views of a cartridge receptacle 10 and of a cartridge system 1 according to a third embodiment of the present invention. The third embodiment is similar to the second embodiment illustrated by FIGS. 3a to 3g, although, in the third embodiment, in contrast to the second embodiment, the piercing spike 73 is not fixedly connected to the cartridge receptacle 10, but rather the cartridge receptacle 10 has a spike guide 80 in which the piercing spike 73 is mounted in a displaceable manner. The sealing element 18 is in this case opened not by a relative movement between the cartridge 2 and cartridge receptacle 10 but by the displaceable piercing spike 73 being transferred between a retracted position, in which the piercing spike 73 is away from the sealing element 18 (cf. FIG. 4b), and an extended position, in which the piercing spike 73 pierces the sealing element 18 (cf. FIG. 4c) and projects into the cartridge opening 63 or into the reservoir 6.

The outer wall of the piercing spike 73 is again provided with the plurality of lateral channels 82 for conveying the beverage substance 7 in the direction of the mixing chamber 8 when the sealing element 18 is pierced, as has already been described for the second embodiment. Furthermore, the compressed-air line 40 is integrated into the piercing spike 73. The piercing spike 73 furthermore does not have a movable compressed-air tip 72, however, as in the second embodiment, but rather the compressed-air line 40 leads into the cartridge opening 63 through a fixed compressed-air tip 72 at the end of the piercing spike 73. In this regard—unlike in the second embodiment—no shifting of the compressed-air tip 72 relative to the piercing spike 73 is necessary here, either. Rather, the compressed-air tip 72 projects automatically into the passage opening 63 when the piercing spike 73 has been shifted into the extended position.

Again, on a side of the piercing spike 73 that is in particular remote from the reservoir 6, the compressed-air connection 42 is formed, which is thus accessible from outside the cartridge receptacle 10 and is connectable to the compressed-air source 41 of the beverage preparation machine 3. Preferably, the piercing spike 73 is transferred from the retracted position into the extended position during or after the insertion of the cartridge system 10 into the beverage preparation machine 3 or after the starting of the beverage production process, preferably by compressed air, which flows into the cartridge emptying device 34 when the compressed-air source 41 is connected to the compressed-air connection 42, which is formed at the bottom end of the piercing spike 73.

In an analogous manner to the second embodiment, provision is also preferably made in the third embodiment for both the fluid source 91 and the compressed-air source 41 to be coupled directly to the fluid feed 12 and to the compressed-air connection 42, respectively, as soon as the cartridge system 1 is inserted into the beverage preparation machine 3 or a beverage production process is started, and in particular before the sealing element 18 is pierced. In this way, back-contamination in the direction of the beverage preparation machine 3 is effectively avoided because the fluid feed 12 and the cartridge emptying device 34 are immediately under overpressure upon insertion of the cartridge system 1, and this prevents the beverage substance 7 from traveling in the direction of the fluid source 91 and compressed-air source 41, respectively. The beverage substance 7 can thus move only in the direction of the mixing chamber 8 from the reservoir 6 as soon as the sealing element 18 is opened.

FIG. 5a illustrates a schematic view of a cartridge receptacle 10 and of a cartridge system 1 according to the first, second or third embodiment of the present invention, inserted into a retaining unit 90 of a beverage preparation machine 3. FIG. 5b shows a detail view of the retaining unit 90, which consists substantially of a receptacle for the cartridge receptacle 10, and comprises a line, running to the fluid source 91 of the beverage preparation machine 3, for connecting to the fluid feed of the cartridge system 1.

The present teachings envision any of the following features of a cartridge receptacle, a cartridge system, and/or a beverage preparation machine in any combination: a cartridge receptacle for producing a beverage by means of a cartridge which comprises a reservoir filled with a beverage substance; the cartridge receptacle is insertable into a beverage preparation machine and is connectable to a cartridge; the cartridge receptacle has a mixing chamber that is fluidically connectable to the reservoir and a fluid feed that leads into the mixing chamber; the cartridge receptacle has a cartridge emptying device which is provided to at least partially transfer the beverage substance from the reservoir into the mixing chamber; the cartridge receptacle is connectable fixedly or releasably to the cartridge; the mixing chamber has mixing structures in the region of the outlet of the fluid feed into the mixing chamber; the cartridge emptying device comprises a compressed-air connection for connecting to the compressed-air source, and a compressed-air line which extends from the compressed-air connection to a compressed-air outlet; the compressed-air outlet protrudes in particular in the direction of the reservoir of the cartridge in order to blow compressed air into the reservoir; the cartridge emptying device is configured such that the beverage substance is pushed out of the reservoir into the mixing chamber by the compressed air; the mixing chamber has a beverage outlet through which the beverage formed from a blend of the beverage substance with the fluid is dispensed; the cartridge receptacle is preferably configured such that the beverage is able to be introduced directly into a portable vessel from the beverage outlet; the cartridge receptacle is releasably connectable to the cartridge via a latching connection; the cartridge receptacle has elastic latching elements which engage behind a retaining flange formed on the cartridge when the cartridge is fastened in the cartridge receptacle; the cartridge receptacle is formed substantially in one part; the cartridge receptacle comprises a cover element and an outlet element connected to the cover element; the cover element is reversibly connectable and in particular latchable to the cartridge such that a cartridge opening leading to the reservoir is closed at least temporarily or partially by the cover element; the outlet element is reversibly connectable and in particular latchable to the cover element; the outlet element has the fluid feed, the compressed-air connection, the mixing chamber and/or the beverage outlet; the cover element has the compressed-air outlet, projecting in the direction of the reservoir, in particular in the form of a hollow spike, which is operatively connected via the compressed-air line to the compressed-air connection formed on the cover element or on the outlet element; a fluidic connection between the cartridge opening and the mixing chamber is able to be established by means of a valve unit; the valve unit is transferable by a relative movement between the cover element and the outlet element from a closed state into an open state in order to establish the fluidic connection; the cover element has a passage opening leading to the cartridge opening; the valve unit is formed by the passage opening and a protrusion, protruding into the passage opening, of the outlet element; by way of a relative movement between the cover element and the outlet element, the protrusion is shifted from a position closing the passage opening into a position partially opening up the passage opening; the wall of the passage opening is provided with at least one lateral channel; the protrusion is arranged in the region of the at least one lateral channel in the position partially opening up the passage opening; the cartridge has a cartridge opening fluidically connected to the reservoir; the cartridge opening is closed by a sealing element; the sealing element comprises in particular a sealing foil which has been applied to and preferably sealed onto the edge of the cartridge opening; the cartridge receptacle comprises a piercing spike that protrudes in the direction of the cartridge, such that, as a result of a relative movement between the cartridge receptacle and the cartridge, the piercing spike pierces the sealing element and a fluidic connection between the reservoir and the mixing chamber is created; at least one lateral channel for conveying the beverage substance in the direction of the mixing chamber when the sealing element has been pierced has been introduced into the wall of the piercing spike; the piercing spike has a through-hole in which a compressed-air tip is mounted so as to be displaceable between a retracted position, in which the compressed-air tip does not project beyond the piercing spike in the direction of the reservoir, and an extended position, in which the compressed-air tip projects beyond the piercing spike and into the reservoir; the compressed-air line is integrated into the compressed-air tip; the compressed-air connection is formed on a side of the compressed-air tip that is in particular remote from the reservoir; the compressed-air connection is preferably accessible from outside the cartridge receptacle; the compressed-air tip is transferred from the retracted position into the extended position by a release element of the beverage preparation machine when the cartridge system is inserted into the beverage preparation machine; the cartridge receptacle comprises a spike guide and a piercing spike mounted in a displaceable manner within the spike guide; the piercing spike is displaceable between a retracted position, in which the piercing spike is away from the sealing element, and an extended position, in which the piercing spike pierces the sealing element and projects into the reservoir; at least one lateral channel for conveying the beverage substance in the direction of the mixing chamber when the sealing element has been pierced has been introduced into the outer wall of the piercing spike; the compressed-air line is integrated into the piercing spike; the compressed-air connection is formed on a side of the piercing spike that is in particular remote from the reservoir; the compressed-air connection is preferably accessible from outside the cartridge receptacle; the piercing spike is transferred from the retracted position into the extended position by a release element of the beverage preparation machine when the cartridge system is inserted into the beverage preparation machine; the cartridge system is insertable into a beverage preparation machine; the cartridge system has a cartridge, which comprises a reservoir filled with a beverage substance, and a cartridge receptacle, connected to the cartridge; the cartridge receptacle has a mixing chamber, a cartridge emptying device which is provided to at least partially transfer the beverage substance from the reservoir into the mixing chamber, and a fluid feed that leads into the mixing chamber; the cartridge is connected fixedly or releasably to the cartridge receptacle; the cartridge system is configured such that the beverage substance is pushed out of the reservoir into the mixing chamber by the compressed air; the fluid feed is supplied with fluid which is cooled by a refrigeration unit; the refrigeration unit is part of the beverage preparation machine or of a separate refrigerator operatively connected to the beverage preparation machine; the refrigeration unit comprises a compressor cooling unit, an absorber cooling unit or a thermoelectric cooler; the fluid feed is supplied with fluid to which carbonic acid is added by a carbonator; the carbonator is part of the beverage preparation machine; the carbonator has a receptacle for a $CO_2$ cartridge and a feeding device for adding $CO_2$ from the $CO_2$ cartridge to the fluid; the cartridge receptacle is releasably connected to the cartridge via a latching connection; the cartridge receptacle has elastic latching elements which engage behind a retaining flange formed on the cartridge when the cartridge is fastened in the cartridge receptacle; the cartridge has a cartridge opening fluidically connected to the reservoir; the cartridge opening is closed by a sealing element; the sealing element comprises in particular a sealing foil which has been applied to and preferably sealed onto the edge of the cartridge opening; the cartridge has a further cartridge opening on an opposite side from the cartridge opening, said further cartridge opening being closed by a further sealing element, in particular a further sealing foil; a beverage preparation machine for producing a beverage, into which a cartridge system is insertable; the beverage preparation machine has a retaining unit into which the cartridge receptacle connected to the cartridge is insertable, a fluid source for injecting the fluid into the fluid feed, and a compressed-air source for blowing compressed air into the compressed-air connection; the beverage preparation machine has the release element for transferring the compressed-air tip or the piercing spike from the retracted position into the extended position.

The present teachings also envision a method for producing a beverage with a cartridge system having any of the following steps or elements in any combination: inserting the cartridge system into a retaining unit of a beverage preparation machine; transferring the beverage substance from the reservoir of the cartridge into the mixing chamber of the cartridge receptacle by means of the cartridge emptying device; injecting a fluid into the mixing chamber by means of the fluid feed; discharging the beverage created in the mixing chamber by blending the beverage substance with the fluid, by means of a beverage outlet; wherein the beverage substance is transferred from the reservoir into the mixing chamber by compressed air; wherein the fluid is cooled and/or carbonated before being injected into the mixing chamber; wherein, before, during or after the insertion of the cartridge system into the retaining unit, a compressed-air tip or the piercing spike is transferred from a retracted position into an extended position and perforates a sealing element at the cartridge opening; wherein, before, during or after the insertion of the cartridge system into the retaining unit, a fluidic connection is established between the reservoir and the mixing chamber by a valve unit being opened by way of a relative movement between a cover element and an outlet element.

LIST OF REFERENCE SIGNS

1 Cartridge system
2 Cartridge
3 Beverage preparation machine
6 Reservoir
7 Beverage substance
8 Mixing chamber
10 Cartridge receptacle
11 Beverage outlet
12 Fluid feed
18 Sealing element
19 Further sealing element
34 Cartridge emptying device
40 Compressed-air line
41 Compressed-air source
42 Compressed-air connection
43 Compressed-air outlet
50 Latching connection
51 Latching elements
52 Retaining flange
60 Cover element
61 Outlet element
62 Passage opening
63 Cartridge opening
64 Protrusion
65, 71, 82 Lateral channel
70 Beverage
71 Lateral channel
72 Compressed-air tip
73 Piercing spike
80 Spike guide
81 Piercing spike
82 Lateral channel 90 Retaining unit
91 Fluid source

The invention claimed is:

1. A cartridge system for producing a beverage, wherein the cartridge system is insertable into a beverage preparation machine, the cartridge system comprising:
  A) a cartridge comprising:
    i) a reservoir filled with a beverage substance;
    ii) a cartridge opening that is closed by a sealing element, the sealing element comprising a sealing foil applied to an edge of the cartridge opening; and
  B) a cartridge receptacle insertable into the beverage preparation machine and releasably connected to the cartridge via a latching connection in a region of the cartridge opening, the cartridge receptacle comprising:
    i) a mixing chamber fluidically connected to the reservoir;
    ii) a fluid feed that leads into the mixing chamber;
    iii) a cartridge emptying device that at least partially pushes the beverage substance from the reservoir to the mixing chamber via compressed air, the cartridge emptying device comprising:
      a) a compressed-air connection that connects to a compressed-air source;
      b) a compressed-air outlet that protrudes in a direction of the reservoir of the cartridge to blow the compressed air into the reservoir; and
      c) a compressed-air line that extends from the compressed-air connection to the compressed-air outlet;
    iv) a spike guide;
    v) a piercing spike mounted in a displaceable manner within the spike guide, wherein the piercing spike is displaceable between a retracted position, in which the piercing spike is away from the sealing element, and an extended position, in which the piercing spike pierces the sealing element and projects into the reservoir to fluidically connect the cartridge opening to the reservoir;
  wherein the compressed-air line is integrated into the piercing spike.

2. The cartridge system as claimed in claim 1, wherein the fluid feed is configured to be supplied with fluid cooled by a refrigeration unit, wherein the refrigeration unit is part of the beverage preparation machine or of a separate refrigerator operatively connected to the beverage preparation machine.

3. The cartridge system as claimed in claim 2, wherein the refrigeration unit comprises a compressor cooling unit, an absorber cooling unit, or a thermoelectric cooler.

4. The cartridge system as claimed in claim 2, wherein the fluid feed is supplied with fluid to which carbonic acid is added by a carbonator.

5. The cartridge system as claimed in claim 4, wherein the carbonator is part of the beverage preparation machine, and wherein the carbonator has a receptacle for a $CO_2$ cartridge and a feeding device for adding $CO_2$ from the $CO_2$ cartridge to the fluid.

6. The cartridge system as claimed in claim 1, wherein the cartridge comprises a circumferential retaining flange, and wherein the latching connection is one or more elastic retaining arms engaging around the circumferential retaining flange.

7. The cartridge system as claimed in claim 1, wherein an outer wall of the piercing spike includes at least one lateral channel for conveying the beverage substance in a direction of the mixing chamber when the sealing element has been pierced.

8. The cartridge system as claimed in claim 7, wherein a plurality of lateral channels are formed on the piercing spike.

9. The cartridge system as claimed in claim 7, wherein the lateral channel is a groove open on one side.

10. The cartridge system as claimed in claim 1, wherein the compressed-air connection is formed on a side of the piercing spike that is remote from the reservoir, wherein the compressed-air connection is accessible from outside the cartridge receptacle.

11. The cartridge system as claimed in claim 1, wherein the piercing spike is transferred from the retracted position into the extended position by a release element of the beverage preparation machine when the cartridge system is inserted into the beverage preparation machine.

12. The cartridge system as claimed in claim 1, wherein the cartridge comprises a bottleneck having the cartridge opening comprising a circumferential retaining flange, wherein the cartridge receptacle is clip-fastened onto the bottleneck.

13. The cartridge system as claimed in claim 1, wherein the piercing spike has a through-hole, and wherein a compressed-air tip is mounted in the through-hole of the piercing spike in a direction of the reservoir, wherein the compressed-air tip is configured to project beyond the piercing spike into the reservoir in the extended position.

14. A cartridge system for producing a beverage, wherein the cartridge system is insertable into a beverage preparation machine, the cartridge system comprising:
  A) a cartridge comprising:
    i) a reservoir filled with a beverage substance;
    ii) a bottleneck comprising a circumferential retaining flange;
    iii) a cartridge opening that is closed by a sealing element, the sealing element comprising a sealing foil applied to an edge of the cartridge opening; and
  B) a cartridge receptacle insertable into the beverage preparation machine and releasably connected to the bottleneck via a latching connection, the cartridge receptacle comprising:
    i) a mixing chamber fluidically connected to the reservoir;
    ii) a fluid feed that leads into the mixing chamber, the fluid feed configured to be supplied with fluid cooled by a refrigeration unit;
    iii) a cartridge emptying device that at least partially pushes the beverage substance from the reservoir to the mixing chamber via compressed air, the cartridge emptying device comprising:
      a) a compressed-air connection that connects to a compressed-air source;
      b) a compressed-air outlet that protrudes in a direction of the reservoir of the cartridge to blow the compressed air into the reservoir; and
      c) a compressed-air line that extends from the compressed-air connection to the compressed-air outlet;
    iv) a spike guide;
    v) a piercing spike comprising a through-hole, the piercing spike mounted in a displaceable manner within the spike guide, wherein the piercing spike is displaceable between a retracted position, in which the piercing spike is away from the sealing element, and an extended position, in which the piercing spike pierces the sealing element and projects into the reservoir to fluidically connect the cartridge opening to the reservoir;

vi) a compressed-air tip mounted in the through-hole of the piercing spike in a direction of the reservoir, wherein the compressed-air tip is configured to project beyond the piercing spike into the reservoir in the extended position.

15. A beverage preparation machine for producing a beverage, in combination with the cartridge system as claimed in claim 1, wherein the beverage preparation machine has a retaining unit into which the cartridge receptacle connected to the cartridge is insertable, a fluid source for injecting fluid into the fluid feed, and the compressed-air source for blowing compressed air into the compressed-air connection.

16. The beverage preparation machine as claimed in claim 15, wherein the beverage preparation machine has a release element for transferring the piercing spike from the retracted position into the extended position.

17. A method for producing a beverage with the cartridge system as claimed in claim 1, having the following steps:

inserting the cartridge system into a retaining unit of a beverage preparation machine;

transferring the beverage substance from the reservoir of the cartridge into the mixing chamber of the cartridge receptacle by the cartridge emptying device;

injecting a fluid into the mixing chamber by the fluid feed;

discharging the beverage created in the mixing chamber by blending the beverage substance with the fluid, by a beverage outlet.

18. The method as claimed in claim 17, wherein the beverage substance is transferred from the reservoir into the mixing chamber by compressed air.

19. The method as claimed in claim 17, wherein the fluid is cooled and/or carbonated before being injected into the mixing chamber.

20. The method as claimed in claim 17, wherein, before, during, or after the inserting of the cartridge system into the retaining unit, the piercing spike is transferred from the retracted position into the extended position and perforates the sealing element at the cartridge opening.

* * * * *

UNITED STATES PATENT AND TRADEMARK OFFICE
CERTIFICATE OF CORRECTION

| | |
|---|---|
| PATENT NO. | : 11,565,926 B2 |
| APPLICATION NO. | : 16/390471 |
| DATED | : January 31, 2023 |
| INVENTOR(S) | : Marc Krüger et al. |

Page 1 of 1

It is certified that error appears in the above-identified patent and that said Letters Patent is hereby corrected as shown below:

On the Title Page

Page 3 Column 1 - Line 17:
FOREIGN PATENT DOCUMENTS
Delete "JP H01226387 A 9/1989"
Insert --JP H01226587 A 9/1989--

Signed and Sealed this
Twenty-eighth Day of March, 2023

Katherine Kelly Vidal
*Director of the United States Patent and Trademark Office*